US009962028B2

(12) United States Patent
Probst

(10) Patent No.: US 9,962,028 B2
(45) Date of Patent: May 8, 2018

(54) APPLIANCE AND METHOD FOR COOKING FOOD USING ALCOHOL

(71) Applicant: COOKAL, Maxeville (FR)

(72) Inventor: Laurent Probst, Alfortville (FR)

(73) Assignee: COOKAL, Maxeville (FR)

( * ) Notice: Subject to any disclaimer, the term of this patent is extended or adjusted under 35 U.S.C. 154(b) by 0 days. days.

(21) Appl. No.: 14/782,203

(22) PCT Filed: Mar. 31, 2014

(86) PCT No.: PCT/FR2014/050755
§ 371 (c)(1),
(2) Date: Oct. 2, 2015

(87) PCT Pub. No.: WO2014/162086
PCT Pub. Date: Oct. 9, 2014

(65) Prior Publication Data
US 2016/0051076 A1 Feb. 25, 2016

(30) Foreign Application Priority Data
Apr. 3, 2013 (FR) ...................... 13 52997

(51) Int. Cl.
A47J 36/26 (2006.01)
A47J 27/00 (2006.01)
A47J 27/10 (2006.01)

(52) U.S. Cl.
CPC ............. A47J 27/002 (2013.01); A47J 36/26 (2013.01); A47J 27/10 (2013.01)

(58) Field of Classification Search
CPC ........... A47J 36/26; A47J 27/002; A47J 27/12

USPC ............................. 126/43, 512, 92 R, 92 AC
See application file for complete search history.

(56) References Cited

U.S. PATENT DOCUMENTS 3,096,754 A * 7/1963 Solomon ............... F24B 1/1802
126/503
6,267,113 B1 * 7/2001 Maust ..................... F24C 3/006
126/512
6,521,001 B2 * 2/2003 Mathew ................ F24B 1/1808
44/265
(Continued)

FOREIGN PATENT DOCUMENTS

EP 0011064 A1 5/1980
FR 2880250 A1 7/2006
(Continued)

OTHER PUBLICATIONS

English translation of International Preliminary Report on Patentability dated Jun. 24, 2015 in International Application No. PCT/FR2014/050755.
(Continued)

Primary Examiner — Gregory Huson
Assistant Examiner — Nikhil Mashruwala
(74) Attorney, Agent, or Firm — Panitch Schwarze Belisario & Nadel LLP

(57) ABSTRACT

The invention relates to a food-cooking or -heating appliance, and a method for cooking or heating food using the appliance. The appliance includes a tank (2) for a combustion liquid, a container (3) for food, and a support (1) for holding the tank (2) and the container (3) in position. The tank (2) includes a base (6) and a sidewall (7) inwardly inclined towards the top.

12 Claims, 1 Drawing Sheet

(56) References Cited

U.S. PATENT DOCUMENTS

| | | | | |
|---|---|---|---|---|
| 7,100,519 B2* | 9/2006 | Tsai | ........................ | A47B 3/087 |
| | | | | 108/132 |
| 7,287,797 B1* | 10/2007 | Belloso | .................. | B62D 21/03 |
| | | | | 296/181.2 |
| 2005/0227194 A1* | 10/2005 | Weinberger | ............... | F23D 5/04 |
| | | | | 431/331 |
| 2009/0241936 A1* | 10/2009 | Husted | .................. | F24B 1/1808 |
| | | | | 126/512 |
| 2012/0282559 A1* | 11/2012 | Barudi | ...................... | F23D 5/04 |
| | | | | 431/12 |
| 2015/0259114 A1* | 9/2015 | Tussy | ................... | B65D 81/365 |
| | | | | 206/457 |

FOREIGN PATENT DOCUMENTS

| | | | |
|---|---|---|---|
| FR | 2897521 | A1 | 8/2007 |
| NL | 7103716 | A | 9/1971 |

OTHER PUBLICATIONS

International Search Report dated Aug. 6, 2014 in International Application No. PCT/FR2014/050755.
Search Report dated Aug. 27, 2013 in FR Application No. 1352997.
Demand for International Preliminary Examination and Article 34 Amendments dated Jan. 30, 2015 in International Application No. PCT/FR2014/050755.
International Preliminary Report on Patentability dated Jun. 24, 2015 in International Application No. PCT/FR2014/050755.

\* cited by examiner

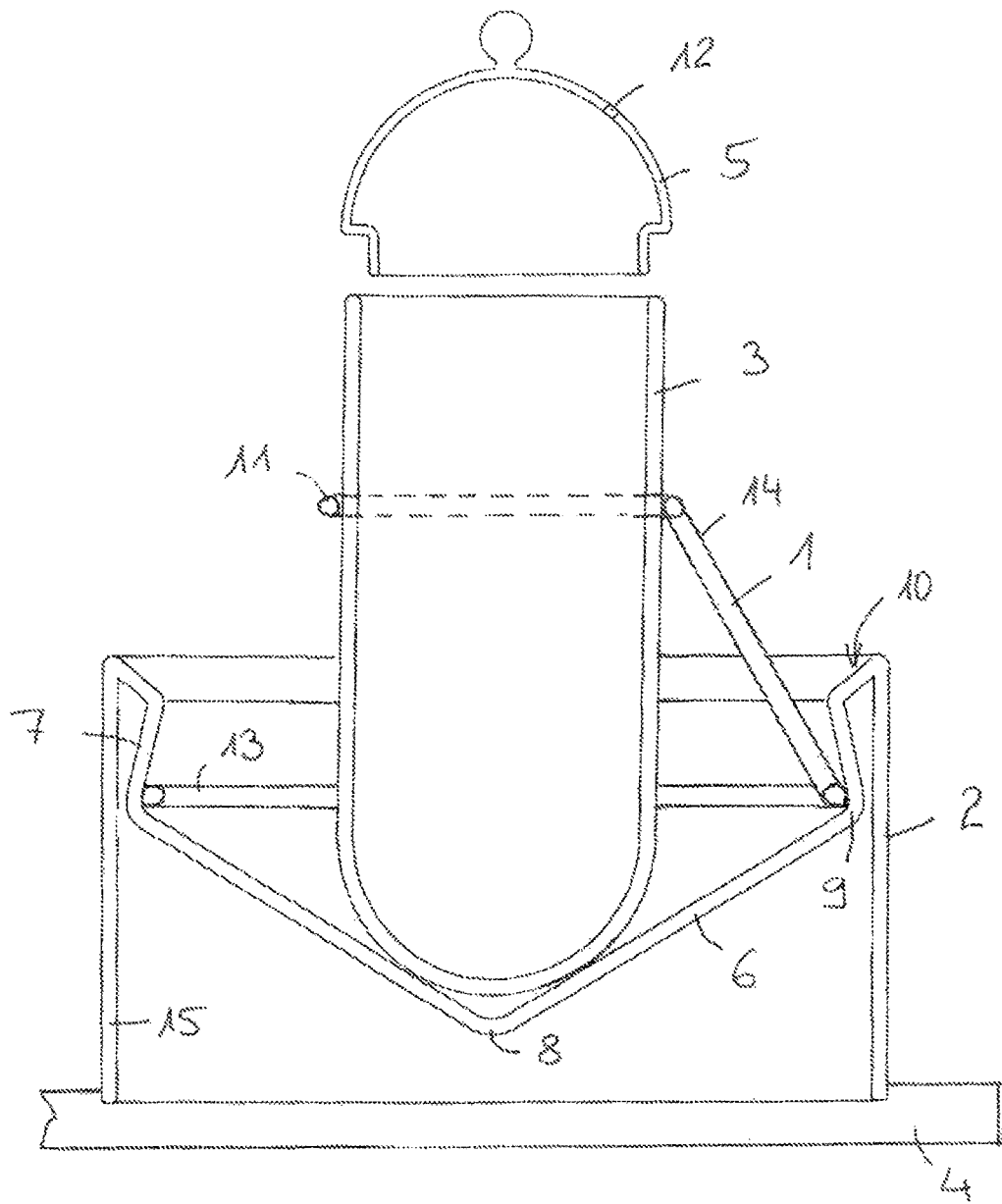

APPLIANCE AND METHOD FOR COOKING FOOD USING ALCOHOL

CROSS REFERENCE TO RELATED APPLICATION

This application is a Section 371 of International Application No. PCT/FR2014/050755, filed Mar. 31, 2014, which was published in the French language on Oct. 9, 2014, under International Publication No. WO 2014/162086 A1, and also claims priority to FR1352997, filed on Apr. 3, 2013, and the disclosure of which is incorporated herein by reference.

BACKGROUND OF THE INVENTION

The invention relates to the field of cooking food. It relates particularly to a cooking appliance that uses alcohol.

Such an appliance is the subject of patent no FR 2 897 521 that describes a food-cooking or heating appliance of the type comprising a support that keeps a tank for combustion liquid in position whereby said support is used to hold a container at a predetermined height in relation to the tank.

Nevertheless, it is difficult to control the cooking with the device as described in this document and the flame does not heat the container in such a way as to obtain a homogenous cooking of food.

BRIEF SUMMARY OF THE INVENTION

The present invention offers to remedy at least part of the aforementioned disadvantages and proposes a solution that makes it possible to obtain homogenous cooking of food placed in a container through the combustion of alcohol placed in a tank outside of said container.

To this end, the invention relates to a tank for a food-cooking or heating appliance of the type comprising a tank to hold a combustion liquid, a container able to keep said food and a support to hold said tank and container in position. This tank is characterized in that it comprises a base and a sidewall inwardly inclined towards the top.

Thanks to these arrangements, burning alcohol in the tank produces a flame that will be sent towards the container and will also allow for reliable and repeatable combustion.

According to other characteristics:
said base can be inclined higher near said sidewall, and lower apart from said wall whereby a confinement volume adapted for combustion is conferred to said tank,
said tank can present a revolution shape that allows for a regularity of the combustion and fabrication ease of the tank,
the diameter of the top of the wall zone can be less than the diameter of the bottom of the wall zone by a value comprised between 2 and 10%, in particular 5%, of the value of the diameter of the top of the wall zone; these values have been observed as giving the best results during several completed tests,
said tank can also comprise, in addition, an opening zone located above said wall zone in the form of an inversed truncated cone, the top of which faces downwards and allows for the alcohol to be easily poured in the tank,
the base can define a base zone that presents an inversed cone shape, the top of which faces downwards and said wall can define a wall zone in the form of a truncated cone, the top of which faces upwards; such an arrangement provides a combination of a qualitative flame and the conduction of the flame towards the container that is particularly favorable and results in quality cooking,
the height of the base zone can be greater, in particular two times greater than the height of the wall zone; such an arrangement produces good results, The present invention also relates to a food-cooking or heating appliance comprising a tank according to the invention, a container intended to keep said food and a support of said tank and container in position; such a cooking appliance presents the advantage of being possibly used on the dinner table individually by each customer or guest.

According to a preferred embodiment of the invention, said container can comprise a base in the shape of a hemisphere that allows for proper stability on the cone-shaped base of the tank.

Finally, the present invention relates to a method for cooking food by means of an appliance according to the invention and comprising the following stages:
the tank is placed on a flat surface, if need be, on a support,
the container is placed in the tank in such a way as to be held by said support whereby the container touches the base of the tank,
the food is placed in said container,
a predetermined quantity of alcohol is poured into the tank,
the alcohol is lit and is left to burn.

The advantage resulting from the present invention is the fact that it allows for reliable and reproducible cooking which can be performed at the table, individually for each customer or guest, which creates an original spectacle prior to tasting the food.

Other characteristics and advantages of the invention are emphasized in the detailed description that is to follow relating to an embodiment that is provided by way of example but not limitation.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

FIG. 1 is a cross-sectional view of a cooking or heating appliance according to the invention.

DETAILED DESCRIPTION OF THE INVENTION

As represented in FIG. 1 of the attached drawing, the present invention relates to a food-cooking or heating appliance comprising a support 1 that is intended to be placed in a tank 2 and to support a container 3.

In order to cook food, for example beaten eggs, tank 2 is placed on a base, for example a table, or slab 4 especially designed for the invention, with space for tank 2, a space for a small spoon and space for a lid 5 of container 3 whereby the last two spaces are not represented on FIG. 1. The support 1 is then placed in tank 2 in the space intended to this end. Subsequently, container 3 is placed on base 6 of tank 2 in such a way as to be held in place by support 1. The food is then introduced in container 3, a predetermined quantity of alcohol is poured in tank 2 around container 3 then lit. The food is cooking while the alcohol combusts. When the alcohol has completely burned up, the food is ready to be served, either directly in container 3 or after being decanted onto a plate.

In order to obtain proper combustion of the alcohol, according to the invention, it is necessary to give an adapted form to the invention. FIG. 1 illustrates an embodiment of such a tank 2, circular in shape, and seen according to a cross-section along a diameter.

According to the invention, sidewall 7 is inwardly inclined. The term "inwardly" signifies in the case of a circular tank 2 that the internal diameter at the lower end of sidewall 7 is more than that at the upper end of this sidewall 7.

In the case of any shape, the term "inwardly" must be interpreted that, according to at least a vertical cross-section of tank 2, the walls are more distant at the lower end of sidewall 7 than at the upper end of this sidewall 7.

Such an inwardly inclined sidewall 7 forces the flame, which is formed by the combustion of the alcohol, to return towards container 3 when rising, which produces more homogenous cooking of the food in container 3.

Tank 2 of FIG. 1 presents the supplementary characteristic that its base 6 is also inclined towards the bottom in its center 8 in such a way that its center 8 is located lower than its circumference 9. This presents the additional advantage that alcohol is regrouped near container 3 while, if base 6 was flat and horizontal, the alcohol would be spread across the entire surface of base 6. Thanks to an inclined base 6, a better flame is obtained.

In the represented example, the inclination of base 6 is accomplished in the form of a cone which manifests itself on the cross-section via a straight line, inclined at approximately 30° in relation to the horizontal line. This results for a diameter at the top of the sidewall 7 of 110 mm, in a depth of the base 6 of approximately 30 mm. The sidewall 7 presents a height of approximately 20 mm on the represented example and it extends to its top by an opening zone 10 of approximately 10 mm in height, where the sidewall 7 is inclined in the other direction at approximately 45°. This opening zone 10 presents the advantage of facilitating the pouring of alcohol into tank 2.

Tank 2 can be completed by an external shaft 15 that makes it possible to place it sturdily on a table or slab 4 intended to this end.

Container 3 preferably comprises an elongated vertical cylindrical part, for example approximately 100 mm high and with a diameter of approximately 50 mm. Its base is rounded, for example along a radius of approximately 25 mm, in such a way to form a half-sphere. Such a rounding provides a better stability to container 3 placed on base 6 of tank 2 than a flat base, which only requires from the support 1 a unique support by means of an arch 11 of support 1 at approximately 25 mm from the top of container 3. Furthermore, the rounding at the base of container 3 is relatively easy to produce. Additionally, the portion of the alcohol that is likely to be trapped between base 6 of tank 2 and the base of container 3 is negligible and does not justify a more precise adjustment of the shapes, which would be costly.

Container 3 is preferably transparent, making it possible to observe the food-cooking process. It may be made out of glass with a weak dilatation coefficient, for example of the borosilicate type such as the glass known under the Pyrex brand in order to support the changes of temperature caused by cooking. Container 3 can also be completed with a detachable lid 5, also preferably transparent, for example also made out of borosilicate glass. A small hole 12 can be provided in lid 5 with a diameter of 2 to 3 mm to allow the air or vapor to escape when there is a desire to cook with lid 5.

Support 1 can for example consist of said arch 11 intended to surround container 3 in a zone located in its top half, a ring 13 intended to be lodged on base 6 of tank 2, and a connecting link 14 that links arch 11 with ring 13 in a rigid manner. Preferably, ring 13 will be arranged in order to be lodged near sidewall 7 to ensure the stability of support 1. It may be devised that ring 13 does not constitute a complete circle to allow it to be introduced through the opening formed by the upper extremity of sidewall 7.

According to another embodiment, base 6 and sidewall 7 can also be formed together by a spherical shape cut slightly above the half of a sphere in such a way that base 6 constitutes the lower part of the sphere and the sidewalls the part above the half of the sphere in which part the diameter shrinks. This embodiment is also within the scope of the invention even if there is no discontinuity between base 6 and sidewall 7. Nevertheless, it will be appropriate to provide a specific shape at the bottom of base 6 to ensure the stability of container 3, as well as a support for support 1.

According to another embodiment, support 1 can also be arranged to support both tank 2 and container 3 in such a way to allow container 3 to be placed on base 6 of tank 2.

The advantage of the present invention lies in particular in the fact that the cooking appliance makes it possible to cook food in a reliable and repetitive manner with a small quantity of alcohol and also in a way to make the cooking process visible for the customer or the guest.

Although the invention has been described regarding a particular embodiment, it goes without saying that it is by no means limited and that various modifications can be applied to it as far as shape, materials and combinations of these various elements are concerned without having to distance oneself from the framework of the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A food-cooking or heating appliance comprising a tank (2) for holding a combustion liquid, a container (3) for receiving food therein and a support (1) for supporting the container (3) in position,
   wherein the container (3) comprises an elongated vertical cylindrical part, and
   wherein the tank (2) comprises a base (6) and a sidewall (7) inwardly inclined towards a top end of the tank, such that the sidewall (7) forces a flame, formed by combustion of the liquid, towards and rise along the vertical cylindrical part of the container (3).

2. The appliance according to claim 1, wherein the base (6) is inclined, an elevation thereof being higher proximate the sidewall and lower with distance from the sidewall.

3. The appliance according to claim 1, wherein the tank (2) is revolution shaped.

4. The appliance according to claim 1, wherein a diameter of a top end of the sidewall is smaller than a diameter of a bottom end of the sidewall by 2% to 10% of the diameter of the top end of the sidewall.

5. The appliance according to claim 4, wherein the diameter of the top end of the sidewall is smaller than the diameter of the bottom end of the sidewall by 5% of the diameter of the top end of the sidewall.

6. The appliance according to claim 3, wherein the tank (2) further comprises an opening zone (10) above the sidewall in the form of an inversed truncated cone, a top end thereof being downward facing.

7. The appliance according to claim 3, wherein the base (6) defines an inverse cone shaped base zone, a top end thereof being downwardly facing, and the sidewall defines a truncated cone shaped wall zone, a top end thereof being upwardly facing.

8. The appliance according to claim 7, wherein a height of the base zone is greater than a height of the wall zone.

9. The appliance according to claim 8, wherein the height of the base zone is double the height of the wall zone.

10. The appliance according to claim 1, wherein the container (3) includes a hemisphere shaped base.

11. A method for cooking food by using the appliance of claim 1, the method comprising of the following steps:
    placing the tank (2) on a flat surface,
    placing the container (3) in the tank (2), the container being held by the support (1) and the container (3) touching the base (6) of the tank (2),
    placing food in the container (3),
    pouring a predetermined quantity of alcohol in the tank (2), and
    lighting, and, in turn, burning, the alcohol.

12. The appliance according to claim 1, wherein the top end of the tank (2) extends higher than a lower end of the elongated vertical cylindrical part of the container (3).

\* \* \* \* \*